United States Patent [19]

Dufresne et al.

[11] Patent Number: 5,654,252
[45] Date of Patent: Aug. 5, 1997

[54] PROCESS FOR STARTING A HYDROCARBON CONVERSION BY THE PRIOR TREATMENT OF THE CATALYST WITH A SULPHUR AGENT AND THEN DILUTED HYDROGEN

[75] Inventors: Pierre Dufresne, Valence; Hans Rabehasaina, Loriol sur Drome; Georges Berrebi, Bourg les Valences, all of France

[73] Assignee: Europeenne De Retraitement De Catalyseurs Eurecat, La Voulte sur Rhone, France

[21] Appl. No.: 455,988

[22] Filed: May 31, 1995

Related U.S. Application Data

[63] Continuation of Ser. No. 932,540, Aug. 20, 1992, abandoned.

[30] Foreign Application Priority Data

Aug. 22, 1991 [FR] France ................... 91 10592

[51] Int. Cl.$^6$ ................... B01J 25/02
[52] U.S. Cl. ............ 502/220; 502/168; 502/216; 502/219; 502/22; 502/31; 208/46; 208/106; 208/108; 208/113
[58] Field of Search ................... 562/220, 168, 562/216, 219, 23, 31; 208/46, 108, 106, 113

[56] References Cited

U.S. PATENT DOCUMENTS

| | | | |
|---|---|---|---|
| 4,177,136 | 12/1979 | Harrington | 208/216 R |
| 4,530,917 | 7/1985 | Berrebi | 502/7 |
| 4,719,195 | 1/1988 | Toulhout et al. | 502/216 |
| 4,977,117 | 12/1990 | Berrebi | 502/220 |

FOREIGN PATENT DOCUMENTS

| | | |
|---|---|---|
| 0 335 754 | 2/1989 | European Pat. Off. . |
| 0 409 680 | 6/1990 | European Pat. Off. . |
| 0 448 435 | 3/1991 | European Pat. Off. . |

*Primary Examiner*—Helane Myers
*Attorney, Agent, or Firm*—Millen, White, Zelano, & Branigan P.C.

[57] ABSTRACT

A process is provided for starting a catalytic hydrocarbon conversion reaction or using a hydrocarbon conversion catalyst into which a sulfur agent has been incorporated. In an inert atmosphere, the sulfur-impregnated catalyst is treated with dilute hydrogen to prevent excessive temperatures during the exothermic transformation of oxides into sulfides of the active metals of the catalyst.

12 Claims, No Drawings

PROCESS FOR STARTING A HYDROCARBON CONVERSION BY THE PRIOR TREATMENT OF THE CATALYST WITH A SULPHUR AGENT AND THEN DILUTED HYDROGEN

This is a continuation, of the application Ser. No. 07/932,540 filed Aug. 20, 1992 now abandoned.

BACKGROUND OF THE INVENTION

A method for the presulphurization of catalysts used in refining and in petrochemistry. Sulphur is incorporated into the catalytic material and then at the time of starting up the refining or petrochemical reactions, in the presence of hydrogen, the oxides of the active metals present in the catalyst are converted into sulphides.

In methods for the incorporation of sulphur into or unto the catalytic material, a sulphurized compound chosen from among all adequate sulphurized compounds, particularly the organic polysulphides described in the Applicant's U.S. Pat. No. 4,530,917 in accordance with the formula: R—S(n)—R', is incorporated, in which n is an integer from 3 to 20 and where the radicals R and R', which can be the same or different, in each case represent an organic radical, each containing 1 to 150 carbon atoms per molecule, said radicals being chosen from within the group constituted by saturated or unsaturated, straight or branched-chain alkyl radicals or of the naphthene type, aryl radicals, alkyl aryl radicals and aryl alkyl radicals and in which R' can also represent the hydrogen atom, with as an example of the polysulphide ditert. dodecyl polyslphide (n=5) and ditert. nonyl polysulpide (n=5).

It is also possible to use ammonium disulphide and/or sulphur in powder form (flowers of sulphur), the latter then being used in suspension alone or mixed with another sulphurized compound (e.g. an organic polysulphide as defined hereinbefore) and as described in French patent application EU 90/03596 of Mar. 19, 1990.

In the method for the starting of petrochemical or refining reactions carried out in the presence of catalysts previously contacted with a sulphur compound, exothermicity phenomena occur at temperatures frequently close to 150° C. These exothermic phenomena are due to the conversion of oxides into sulphides or possibly oxysulphides into sulphides, which takes place at the time of starting up the reaction on introducing hydrogen onto the catalytic material.

These exothermic phenomena are not prejudicial in the case of small units, particularly when on starting the charge is in the liquid state, because the calories are easily evacuated when the charge passes into the gaseous state. The exothermic phenomena do not cause much of a problem if a refining reaction can take place in several beds of modest size in place of a single, large bed. However, it is becoming increasingly common to use large units (particularly residue treatment units), where the reactors can contain more than 200 tons of catalysts.

Generally, hitherto, after incorporating an adequate sulphur quantity into the catalytic material, i.e., a quantity able to bring about the stoichiometric conversion of oxides of active metals into sulphides, the following procedure is used with respect to the catalyst prior to the hydrogen reduction of said catalyst. The catalyst is fed into a reactor, purging takes place several times under nitrogen and, when there are no longer any oxygen traces in the enclosure, there is a passage into a hydrogen atmosphere and the heating furnaces are ignited, followed by heating up to 150° C.

It is then possible to carry out the real sulphurizatio of the catalyst by introducing hydrogen. This exothermic reaction can be written in the following way, symbolizing by S the random sulphurizing agent, e.g., elementary sulphur, organic polysulphide, thiol, etc.

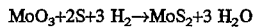

$$MoO_3 + 2S + 3\ H_2 \rightarrow MoS_2 + 3\ H_2O$$

This reaction can give rise to a significant temperature elevation in the catalytic bed, which may lead to a damage to the catalyst or equipment.

When it is not possible to control an exothermic situation, there must be an emergency shutdown of the unit and all the valves must be opened in order to torch the effluents, with decompression producing cold, so that there is a return to normal atmospheric conditions.

SUMMARY OF THE INVENTION

The process according to the invention makes it possible to competely obviate these disadvantages. It consists of treating the catalyst with a gas containing a mixture of nitrogen and hydrogen (or an inert gas-hydrogen mixture), in order to control the kinetics of the aforementioned reaction. This process makes it possible to control the reaction of converting oxides into sulphides and leads to a significant reduction in the exothermicity.

Thus, after incorporating or impregnating the sulphur compound in the catalytic material in accordance with one of the earlier-dated patents of the assignee, the invention specifically consists of (a) purging the enclosure containing the catalyst by scavenging with an inert gas (preferably nitrogen) in order to eliminated residual molecular oxygen, said purge taking place at a temperature of approximately 0° to 50° C. and preferably close to ordinary temperature, then (b) the enclosure under pressure, e.g., between 10 and 70 bars, is brought under an atmosphere of an inert gas (preferably nitrogen), whose flow rate varies at this state in exemplified manner between approximately 50 and 100 liters per liter of catalyst per hour, preferably between 100 and 800 liters/hour, then (c) there is a continuous, periodic or semicontinuous (e.g., in stages) rise in the temperature of the enclosure by 10° to 90° C. per hour and preferably 20° to 80° C. per hour, while maintaining the inert gas flow, until the temperature of the enclosure (stabilization temperature) is approximately 140° to 200° C. and preferably 150° to 190° C.

Then, in stage (d) and while substantially maintaining the same pressure and same gas flow as in state (c), there is introduced into the enclosure and therefore on the catalytic material a mixture of inert gas and hydrogen in place of an inert gas alone, the hydrogen percentage in the inert gas being between 1 and 15, preferably 2 and 10 and more particularly 3 and 8% by volume. The flow rate of the mixture is generally maintained until the conversion of oxides into sulphides is substantially complete, the increase in temperature at the start of stage (d) or during stage (d) not exceeding by more than 30° or 20° that of state (c) and then optionally reassumes a value similar to that used in state (c). This treatment in the enclosure containing the catalytic material is performed in situ or ex situ. If it is performed in situ, the enclosure being here the actual reactor of the refining or petrochemical operation, at the end of the treatment according to the invention it is possible to introduce substantially pure hydrogen in a state (e), replacing the inert gas-hydrogen mixture and substantially simultaneously the reactor or enclosure temperature is raised to a level able to complete the actual sulphurization state, e.g., 280° to 400°

C. and more particularly 300° to 380° C. If the treatment is performed ex situ, the catalyst is then stored and supplied to the site.

It can sometimes be advantageous to continue to treat it, in a stage (e), in the said enclosure and using substantially pure hydrogen after substantially simultaneously raising the temperature of the enclosure to, e.g., between 280° and 400° C. In both cases, namely whether the catalyst is treated in situ or ex situ, there is an exothermicity which occurs on introducing the inert gas-hydrogen mixture onto the catalyst in place of the inert gas alone. However, this exothermicity is limited compared with that which would have occurred if the catalytic material had been directly treated by undiluted hydrogen. The examples show that in state (c) at the end of a few hours of introduction of the inert gas-hydrogen mixture, that the temperature has only risen by approximately 30° or 20° C. and rapidly drops to the temperature of stage (c).

The temperature rise can even be less than 10° C. if, instead of operating completely in the gaseous phase, operation partly takes place in the liquid phase and in the manner such that following stage (c) and before stage (d), the catalytic material is treated with an atmospheric distillation liquid gas oil or an equivalent hydrocarbon liquid charge, with a flow rate of approximately 0.5 to 2 liters/hour for approximately 1 to 6 hours before carrying out stage (d). The sulphurization reaction of metal oxides of the molybdenum or tungsten and cobalt or nickel type is controlled by progressive hydrogen addition.

By the hydrogen flow rate, $\Delta T$ monitoring is possible, i.e., the increase in temperature due to the exothermic reaction. In this way the hydrogen mixed with the inert gas is introduced continuously, semicontinuously or periodically at the desired speed so as not to exceed a limit value prejudicial to the satisfactory performance of the operation. The hydrogen flow rate is controlled by an adequate compressor.

EXAMPLE 1

Use is made of a hydrodesulphurizaton catalyst containing 3% cobalt oxide (CoO) and 14% molybdenum trioxide $MoO_3$, the remainder being constituted by alumina. This catalyst with a specific surface of 220 $m^2g$ is presulphurized in the following way. Preparation takes place of a solution constituted by 45% TPS 37, organic polysulphide containing 37% by weight sulphur sold by Societe Nationale Elf Aquitaine and 55% of the type white spirit, heavy petrol with initial and final boiling points of 150° and 250° C. The catalyst is then impregnated with the thus prepared solution by the dry impregnation method, namely 45 ml of solution for 100 g of catalyst. The impregnated solid then undergoes a treatment at 140 C. under a pressure of 10 Torr (1333 Pa) for 2 hours with a view to evaporating most of the solvent. The catalyst which was blue, has then assumed a dark grey to black shade following the said treatment. Its sulphur content is 6.7% by weight and its carbon content 4.9% by weight.

The catalyst is tested in a reactor in order to evaluate the thermal effects during the heating procedures under hydrogen. The catalyst (1.9 liters) is placed in the reactor, which is provided with a heat sink containing three thermocouples located at the intake, in the centre and at the outlet of the catalytic bed. Temperature regulation takes place by means of thermocouples located outside the reactor and against the walls thereof, the three central thermocouples being used for temperature recording purposes.

This procedure for incorporating sulphur into the catalyst is the same in the following examples 2 and 3. In example 1 a procedure for activating the catalyst is described, which is not in accordance with the invention. It consists of tightly closing the reactor, purging he system under nitrogen, introducing the hydrogen and then pressurizing the system at 50 bars of hydrogen under a flow rate of 600 liters of TPN hydrogen per hours. The reaction then undergoes regular heating with a temperature rise of 30° C./hour using electrically heated shells. At approximately 160° C., there is relatively sudden break in the temperature signal compared with the regular temperature rise line and tis indicates the existence of an exothermic phenomenon with the reactor. It is due to the formation reaction of cobalt and molybdenum sulphides from the oxysulphides present initially in the presence of hydrogen. This phenomenon is characterized by the extent of the $\Delta T$ temperature variation compared with the linear curve of 30° C./hour and by calculating the mean on three temperature signals and in this example the $\Delta T$ value is 100° C.

In a small unit it is possible to master this break and it is possible to continue the catalyst hydrogen reduction in order to then start the refining or petrochemical operation. In the case of a large unit, it may not be possible to master or control the break and the unit may have to be shut down.

EXAMPLE 2

This example, according to the invention, uses the same presulphurized catalyst as in example 1 and the same testing equipment.

However, a different activation procedure is used. After purging with nitrogen in state (a), the reactor nitrogen is passed into under a pressure of 50 bars, the flow rate being adjusted to 800 liters of nitrogen/hour—state (b). The temperature is then raised to 180° C. at a rate of 60° C./hour and is then stabilized at this level—stage (c). The nitrogen is then replaced by a nitrogen/hydrogen mixture 5% hydrogen, whilst maintaining a total flow rate of 600 liters/hour—stage (d).

There is a rapid break in the temperature indicators and the mean maximum temperature variation $\Delta T$ is 15° C., the temperature being again stabilized after injecting said mixture for 4 hours. The latter is then replaced in state (e) by substantially pure hydrogen. No thermocouple signal change is recorded. The temperature is then raised to 320° C. at a rate of 30° C./h, without any exothermicity. The sulphurization reaction is performed under gentler conditions than in example 1, because the exothermicity is controlled by the progressive addition of hydrogen.

EXAMPLE 3

This example is a variant of example 2, where the operating protocol is identical up to the time when the temperature is increased (pressure of 50 bars nitrogen, flow rate 600 l/h). The temperature is raised to 180° C. at a rate of 60° C./h and is then stabilized at this level. This is followed by the injection at a rate of 0.95 liter/hour of an atmospheric distillation gas oil with a sulphur content of 0.82% by weight and with initial and final distillation points at 230° and 378° C. and with a density of 0.830. After injecting for three hours, the nitrogen is replaced by a hydrogen/nitrogen mixture containing 10% hydrogen and whilst maintaining a total flow rate of 600 liters/hours.

The thermocouple signals only reveal a slight temperature rise ($\Delta T$) over a period of approximately 2 hours and with an amplitude of 5° C.

EXAMPLE 4 (comparative)

In a manner not in accordance with the invention, a description is given of a pure hydrogen activation producing high exothermicity. The same catalyst is used as in example 1, based on cobalt and molybdenum oxides, but unlike in example 1 it is pretreated in the following way. 98 g of powdered elementary sulphur are mixed with 850 ml of white spirit-type solvent. The suspension is vigorously stirred and added to 1.9 liter of catalyst in a rotary bowl. The impregnation operation lasts 10 minutes and the suspension is stirred in the meantime. The impregnated solid then undergoes a heat treatment at 140° C., under a pressure of 10 Torr with a view to evaporating the solvent. The catalyst has turned a grey colour. On three samples taken from this catalyst batch, the sulphur contents are 6.9, 6.7 and 6.7% by weight and their carbon contents are 0.10, 0.13 and 0.11%.

The solid is then fed into a catalytic test equipment like that of example 1. The reactor is closed, purged under nitrogen and then scavenged with hydrogen. The installation is then pressurized to 50 bars of hydrogen under a flow rate of 600 liters/hour of TPN hydrogen. The reactor then undergoes regular heating at 30° C./hour. At approximately 145° C., there is a break in the temperature curve and a sudden temperature rise is recorded, the mean $\Delta T$ being 180° C.

EXAMPLE 5 (comparative)

Example 4 is repeated, but during the reactivation phase, the catalyst is treated by an atmospheric distillation liquid gas oil with a sulphur content of 0.82% by weight, as explained in example 3. The $\Delta T$ which was 180° C. in example 4 drops to 90° C.

EXAMPLE 6

Example 2 is repeated, but the catalyst is initially impregnated by flowers of sulphur instead of TPS. The $\Delta T$ is 20° C. and is less favourable than in example 2, but he method makes it possible to obtain an acceptable exothermicity, whilst using a sulphur agent more easily available than TPS 37.

EXAMPLE 7

Example 2 is repeated, but in initially the catalyst is impregnated with a 50:50 by weight mixture of flowers of sulphur and TPS, the $\Delta T$ being 15° C.

in the presence of a catalyst, the improvement comprising starting the reaction by:
- (a) purging an enclosure containing a hydrocarbon conversion catalyst having sulfur incorporated or impregnated therein with an inert gas to eliminate from the enclosure traces of molecular oxygen;
- (b) bringing the enclosure under pressure under an inert gas atmosphere;
- (c) progressively raising the temperature of the enclosure by 10° to 90° C. per hour, while maintaining an inert gas flow rate until the enclosure temperature is stabilized at approximately 140° to 200° C.; and
- (d) while substantially maintaining the same pressure in the enclosure and at the same gas flow rate as in step (c), introducing an inert gas-hydrogen mixture into the enclosure, the percentage of hydrogen in the inert has being between 1% and 15% by volume, the flow rate of the mixture being maintained until a substantially complete conversion of oxides into sulfides is effected while not exceeding a temperature more than 30° C. higher than that of the stabilized temperature of state (c).

2. A process according to claim 1, wherein the sulfur agent is elemental sulfur.

3. A process according to claim 1, wherein the sulfur agent is an organic polysulfide.

4. A process according to claim 1, wherein the sulfur agent is a mixture of elemental sulfur and at least one organic polysulphide.

5. A process according to claim 1, wherein the inert gas is nitrogen.

6. A process according to claim 1, wherein stage (a) is performed at between 1°, and 50° C., stage (b) is performed with an inert gas glow of between 50 and 1000 liters/hour until a pressure between 10 and 70 bars is obtained.

7. A process according to claim 1, wherein the treatment of the catalyst is performed ex situ.

8. A process according to claim 1, wherein after stage (d), the catalyst is treated in a stage (e) with substantially pure hydrogen.

9. A process according to claim 8, wherein in stage (e), the temperature is raised to between 280° and 400° C.

10. A process according to claim 7, wherein following stage (c), stage (d) is preceded by an intermediate step of treating the catalyst with a liquid hydrocarbon charge having properties equivalent to an atmospheric distillation gas oil at

SUMMARY TABLE OF THE EXAMPLES

| Example | not according to the invention | according to the invention | sulphurizing agent | phase | hydrogen flow control | $\Delta T$ |
|---|---|---|---|---|---|---|
| 1 | X | | TPS 37 | gas | no | 100 |
| 2 | | X | TPS 37 | gas | yes | 15 |
| 3 | | X | TPS 37 | liq. | yes | 5 |
| 4 | X | | S | gas | no | 180 |
| 5 | X | | S | liq. | no | 90 |
| 6 | | X | S | gas | yes | 20 |
| 7 | | X | 50% S 50% TPS | gas | yes | 15 |

We claim:

1. In a process for (a) starting a catalytic hydrocarbon conversion reaction or (b) using a hydrocarbon conversion catalyst, comprising catalytically converting a hydrocarbon a flow rate of approximately 0.5 to 2 liters/hour for approximately 1 to 6 hours.

11. A process according to claim 7, wherein the following stage (c), stage (d) is preceded by an intermediate treatment of the catalyst with a liquid hydrocarbon charge having properties equivalent to an atmospheric distillation gas oil at a flow rate of approximately 0.5 to 2 liters/hour for approximately 1 to 6 hours.

12. A process for presulfiding a catalyst, comprising
   (a) purging an enclosure containing the catalyst with an inert gas to eliminate from the enclosure any trances of molecular oxygen,
   (b) bringing the enclosure under pressure under the atmosphere of an inert gas,
   (c) progressively raising the temperature of the enclosure by 10° to 90° C. per hour, while maintaining the inert gas flow rate until the enclosure temperature is approximately 140° to 200° C.,
   (d) while substantially maintaining the same pressure in the enclosure and the same gas flow rate as in stage (c), introducing an inert gas-hydrogen mixture into the enclosure, the percentage of hydrogen in the inert gas being between 1% and 15% by volume, the flow rate of the mixture being maintained up to the substantially complete conversion of oxides into sulfides, the temperature rise not exceeding by more than 30° C. that of stage (c).

* * * * *